US012499852B2

(12) United States Patent
Rim et al.

(10) Patent No.: US 12,499,852 B2
(45) Date of Patent: Dec. 16, 2025

(54) REAL-TIME PEAK LUMINANCE CONTROL FOR PULSED ELECTRONIC DISPLAY

(71) Applicant: Apple Inc., Cupertino, CA (US)

(72) Inventors: Seung B Rim, Pleasanton, CA (US); Mahdi Farrokh Baroughi, Santa Clara, CA (US); Hopil Bae, Palo Alto, CA (US); Haitao Li, Mountain View, CA (US); Young Don Bae, San Jose, CA (US); Mahesh B Chappalli, San Jose, CA (US); Meir Harar, Tel-Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/216,489

(22) Filed: Jun. 29, 2023

(65) Prior Publication Data

US 2024/0005890 A1 Jan. 4, 2024

Related U.S. Application Data

(60) Provisional application No. 63/357,486, filed on Jun. 30, 2022.

(51) Int. Cl.
*G09G 5/00* (2006.01)

(52) U.S. Cl.
CPC ....... *G09G 5/003* (2013.01); *G09G 2330/021* (2013.01); *G09G 2360/147* (2013.01)

(58) Field of Classification Search
None
See application file for complete search history.

(56) References Cited

U.S. PATENT DOCUMENTS

| | | | | |
|---|---|---|---|---|
| 8,803,857 B2 * | 8/2014 | Cok | G09G 3/3208 345/204 |
| 2009/0201272 A1 * | 8/2009 | Ahn | H03K 9/08 345/204 |
| 2016/0163258 A1 * | 6/2016 | Cho | G09G 3/3225 345/83 |
| 2019/0347974 A1 * | 11/2019 | Henry | G09G 3/3216 |
| 2021/0333394 A1 | 10/2021 | Pacala | |
| 2021/0407378 A1 * | 12/2021 | Hu | G09G 3/32 |
| 2022/0026920 A1 | 1/2022 | Ebrahimi Afrouzi | |

FOREIGN PATENT DOCUMENTS

WO 2018194747 A1 10/2018

* cited by examiner

*Primary Examiner* — Andre L Matthews
(74) *Attorney, Agent, or Firm* — Fletcher Yoder, P.C.

(57) ABSTRACT

The present disclosure is directed to estimating and modulating peak luminance of the display substantially in real-time to allow very bright pixels to be shown on the electronic display as long as the total electrical energy drawn by the electronic display does not exceed a threshold. The amount of electrical energy that is being drawn by the electronic display may be estimated from the image data by counting the number of rows of pixels that are emitting pulses in discrete bins of time. Because the pulses draw a predictable amount of electrical energy per row per time bin, the amount of electrical energy drawn by the electronic display may be estimated substantially in real time. The image data on the electronic display may therefore be modulated to avoid drawing too much electrical energy from the power source of the electronic device while permitting a high dynamic range.

20 Claims, 20 Drawing Sheets

REAL-TIME PEAK LUMINANCE CONTROL FOR PULSED ELECTRONIC DISPLAY

CROSS-REFERENCE TO RELATED APPLICATIONS

This application claims priority to U.S. Provisional Application No. 63/357,486, filed Jun. 30, 2022, entitled "REAL-TIME PEAK LUMINANCE CONTROL FOR PULSED ELECTRONIC DISPLAY," the disclosure of which is incorporated by reference in its entirety for all purposes.

SUMMARY

This disclosure relates to peak luminance control for an electronic display to avoid drawing excessive power.

Numerous electronic devices—including televisions, portable phones, computers, wearable devices, vehicle dashboards, virtual-reality glasses, and more—display images on an electronic display. Certain electronic displays may have pixels that emit light in pulses. The total amount of light emitted in the pulses may be integrated by the human eye over time to produce the perception of a seamless image on the electronic display. An electronic device that houses such an electronic display may power the electronic display with a power source (e.g., a power source controlled by a power management integrated circuit (PMIC)). The power source may provide the electrical power that is used to produce the pulses of light emitted via the pixels.

If the electronic display were to draw excessive electrical power, it could cause the electronic device to malfunction. For example, by drawing excessive electrical power, the electronic device may experience a malfunction that may cause a front-of-screen (FoS) artifact in the electronic display due to supply ripple, panel overheating (e.g., from PMIC), and/or voltage-current (IR) drop. Some systems avoid drawing excessive power by limiting the amount of power available to each pixel according to a worst-case scenario in which every pixel is emitting a maximum possible amount of light. While this may prevent the electronic display from drawing excessive power, limiting the pixels in this way may reduce the dynamic range of the electronic display and reduce the capability of the electronic display to show high dynamic range (HDR) images.

According to this disclosure, a peak luminance of the electronic display may be estimated and modulated in real time (e.g., for a current image frame on the electronic display) to enable bright pixels (e.g., pixels provided with a relatively greater amount of current) to be shown on the electronic display so long as the power drawn by the electronic display does not exceed a threshold. The amount of power that may be drawn by the electronic display may be estimated from image data by counting, via a one-dimensional array referred to herein as a "pulse counter," the number of rows of pixels that are emitting pulses in discrete storage elements of time that may indicate a location of an element in an array, referred to herein as "time bins." Because the pulses draw a predictable amount of power per row per time bin, the amount of power drawn by the electronic display may be estimated in real time or near real time.

If the power (e.g., current) drawn is below a threshold while the electronic display displays an image at a given brightness (e.g., in nits), the electronic display may continue to operate without power or image data adjustment. However, if the power drawn is above the threshold while the electronic display displays an image at the given brightness, the PMIC may be adjusted to reduce the current, or the image data may be adjusted to reduce the current drawn during display of an image frame.

Additionally, if a voltage drop across the electronic display is below a voltage drop threshold, the electronic display may continue to operate without power or image data adjustment. However, if the voltage drop across the electronic display is above the voltage drop threshold, the PMIC may be adjusted to reduce the current, or the image data may be adjusted to reduce the current drawn—and consequently reduce the voltage drop across the electronic display—during display of the image frame. The image data on the electronic display may therefore be modulated to avoid drawing excessive electrical power from the PMIC of the electronic device while still enabling a high dynamic range and maintaining relative contrast and relative luminance of the image content displayed on the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

To preserve high contrast while preventing excessive power draw, a peak luminance of the electronic display may be estimated and modulated in real-time (e.g., for a current image frame on the electronic display) to enable bright pixels (e.g., pixels provided with a relatively greater amount of current) to be shown on the electronic display so long as the power drawn by the electronic display does not exceed a threshold. The amount of power that may be drawn by the electronic display may be estimated from image data by counting, via a one-dimensional array referred to herein as a "pulse counter," the number of rows of pixels that are emitting pulses in discrete storage elements of time that may indicate a location of an element in an array, referred to herein as "time bins." Because the pulses draw a predictable amount of electrical power per-row per-time bin, the amount of electrical energy drawn by the electronic display may be estimated in real-time or near real-time. The image data on the electronic display may therefore be modulated to avoid drawing excessive electrical power from the power source of the electronic device while still enabling a high dynamic range.

Figure 1:
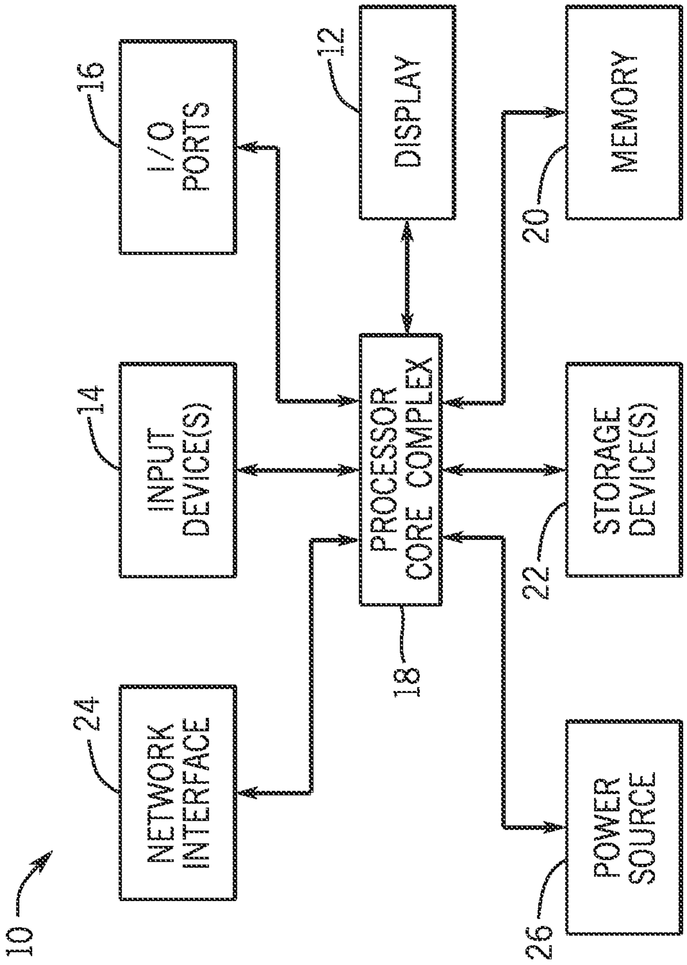
FIG. 1 is a block diagram of an electronic device including an electronic display, in accordance with an embodiment.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, or the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable gate arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with an array of display pixels. Each display pixel may represent a sub-pixel that controls the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18. Moreover, in some embodiments, the electronic device 10 may include multiple electronic displays 12.

Figure 2:
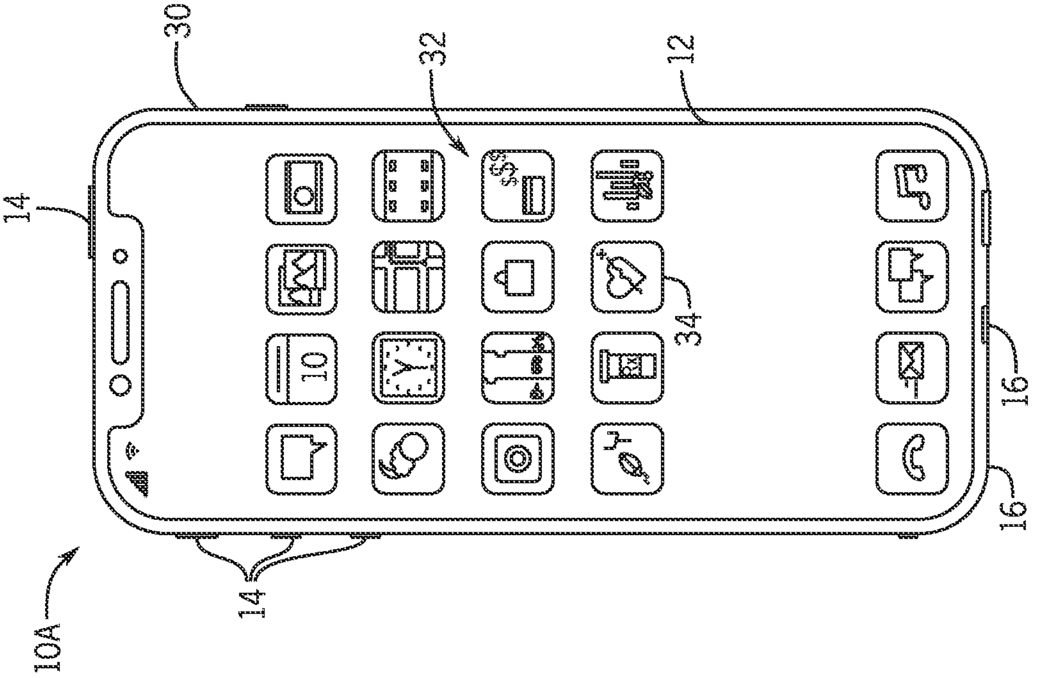
FIG. 2 is an example of the electronic device of FIG. 1 in the form of a handheld device, in accordance with an embodiment.

The electronic device 10 may be any suitable electronic device. One example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30.

Figure 3:
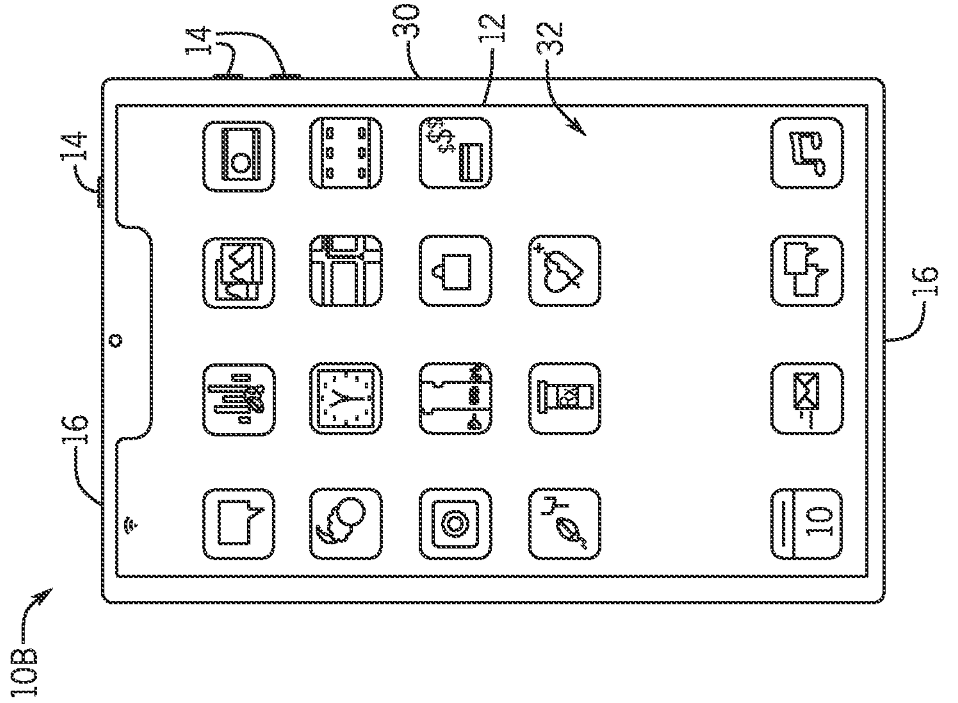
FIG. 3 is another example of the electronic device of FIG. 1 in the form of a tablet device, in accordance with an embodiment.
Figure 4:
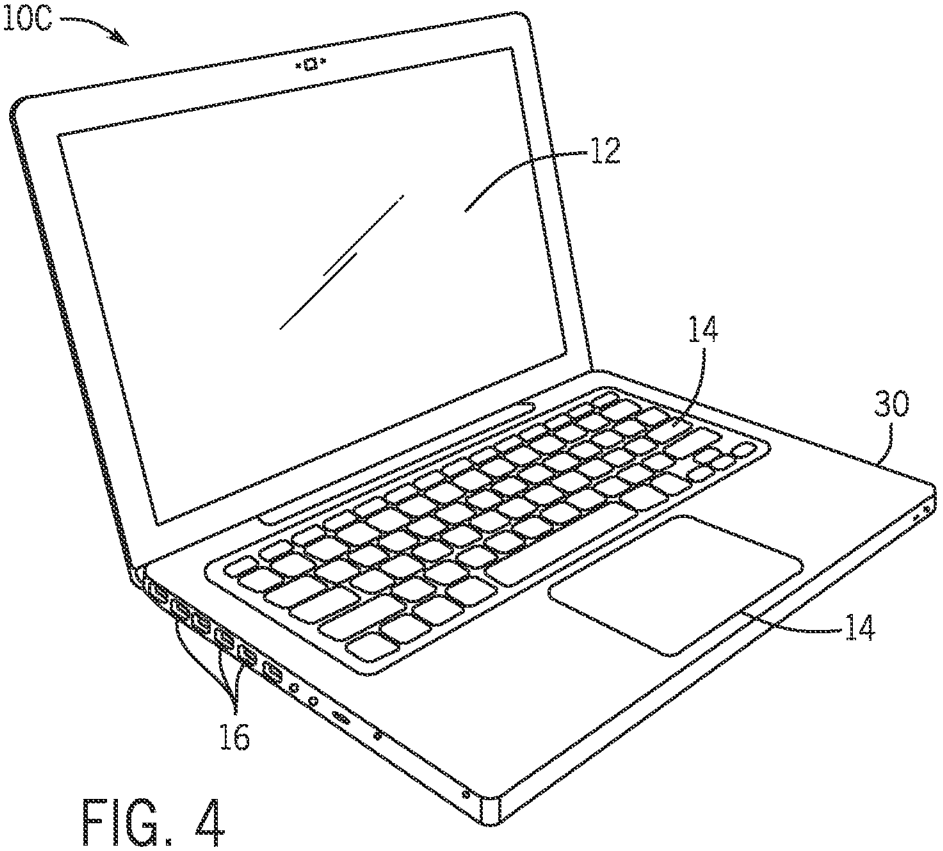
FIG. 4 is another example of the electronic device of FIG. 1 in the form of a notebook computer, in accordance with an embodiment.
Figure 5:
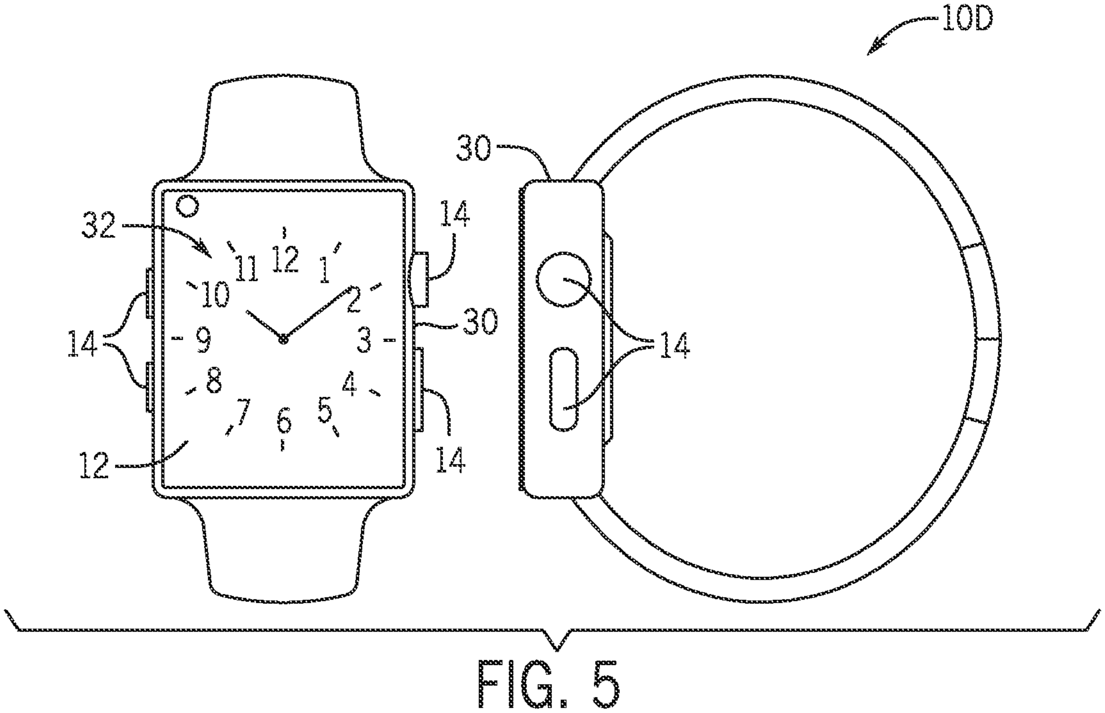
FIG. 5 is another example of the electronic device of FIG. 1 in the form of a wearable device, in accordance with an embodiment.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30.

Figure 6:
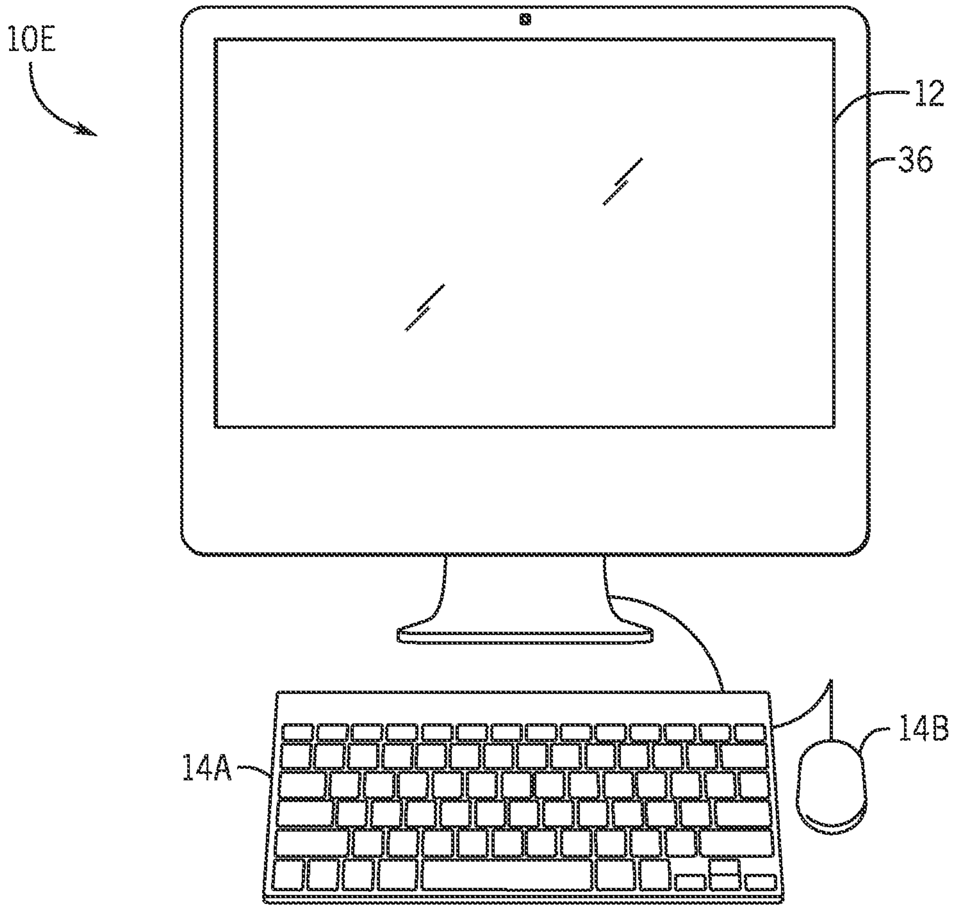
FIG. 6 is another example of the electronic device of FIG. 1 in the form of a front view of a desktop computer in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input devices, such as the keyboard 14A or mouse 14B (e.g., the input devices 14), which may connect to the computer 10E.

Figure 7:
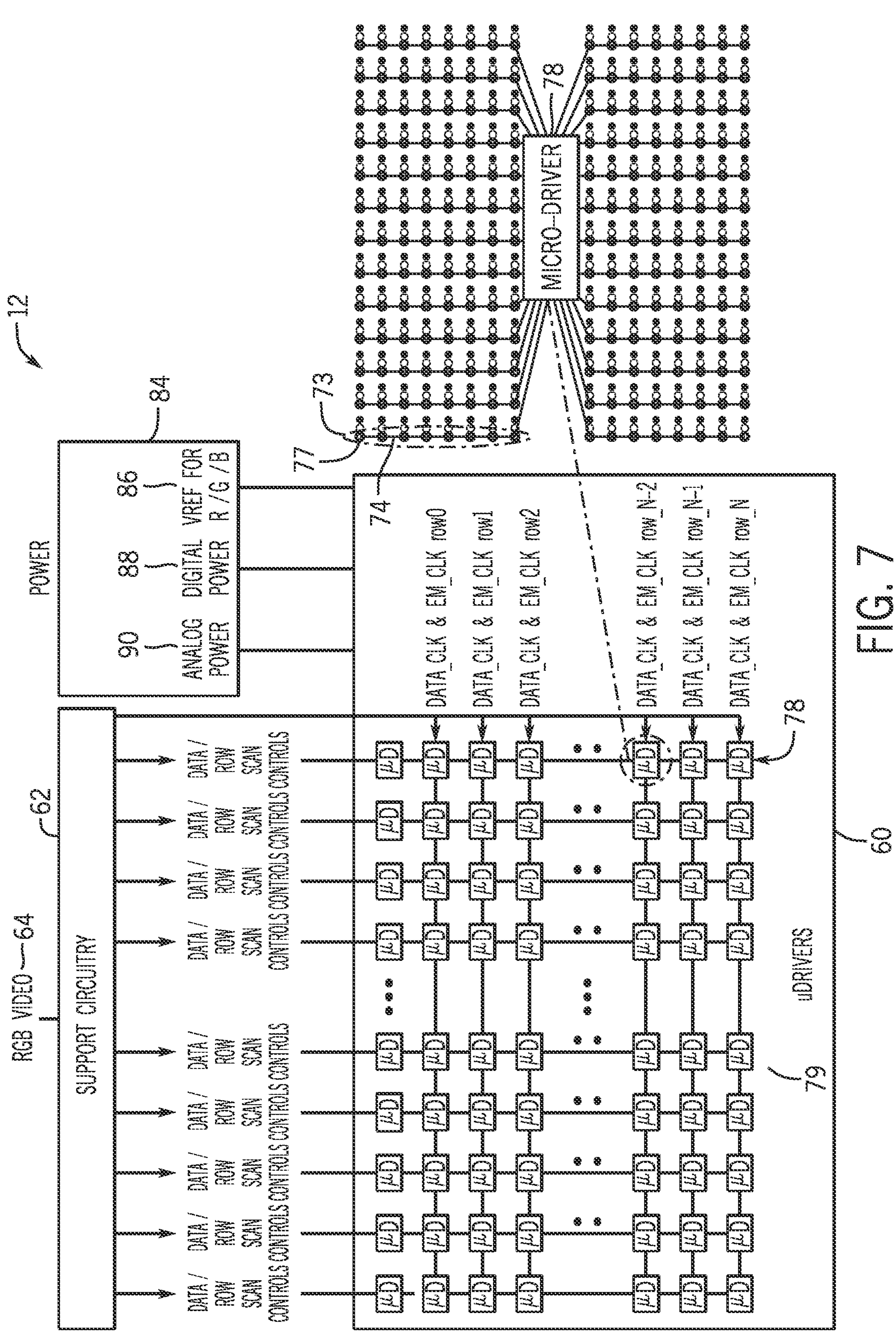
FIG. 7 depicts a block diagram of an example architecture of the electronic display of FIG. 1 in the form of a micro-LED display, in accordance with an embodiment.

FIG. 7 depicts a block diagram of an example architecture of the electronic display 12 (e.g., micro-LED display). In the example of FIG. 7, the electronic display 12 uses an RGB display panel 60 with pixels that include red, green, and blue micro-LEDs as display pixels. Support circuitry 62 may receive RGB-format video image data 64. It should be appreciated, however, that the electronic display 12 may alternatively display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or a emission clock signal (EM_CLK) to control the provision of the image data 64 in the electronic display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 7. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the display panel 60.

In particular, the display panel 60 may include micro-drivers 78. The micro-drivers 78 are arranged in an array 79. Each micro-driver 78 drives a number of display pixels 77. Different display pixels (e.g., display sub-pixel) 77 may include different colored micro-LEDs (e.g., a red micro-LED, a green micro-LED, or a blue micro-LED) to represent the image data 64 in RGB format. Although one of the micro-drivers 78 of FIG. 7 is shown to drive twenty-six anodes 73 having eight display pixels 77 each, each micro-driver 78 may drive more or fewer anodes 73 and respective display pixels 77. As illustrated, the subset of display pixels 77 located on each anode 73 may be associated with a particular color (e.g., red, green, blue). As mentioned above, it should be noted that a respective cathode corresponds to a subset of display pixels 77 associated with a particular color even though each cathode for a particular color channel is not illustrated in FIG. 7. For example, cathode corresponds to a red color channel (e.g., subset of red display pixels 77). Indeed, there may be a second set of cathodes that couple to a green color channel (e.g., subset of green display pixels 77) and a third set of cathodes that couple to a blue color channel (subset of blue display pixels 77), but these are not expressly illustrated in FIG. 7 for ease of illustration.

A power supply 84 (e.g., a power management integrate circuit (PMIC)) may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of micro-LED.

Figure 8:
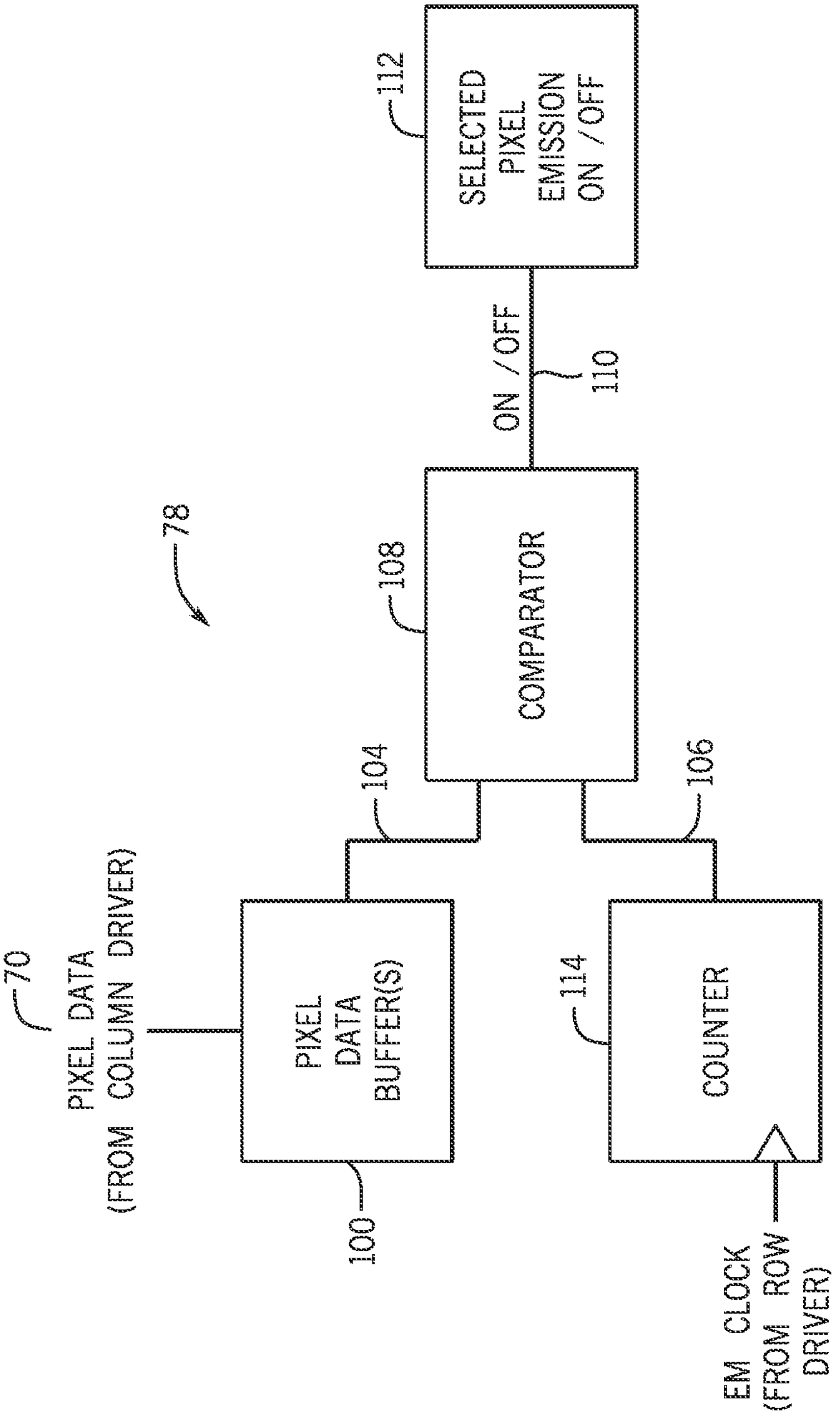
FIG. 8 is a block diagram schematically illustrating an operation of a micro-driver of FIG. 7, in accordance with an embodiment.

A block diagram shown in FIG. 8 illustrates some of the components of one of the micro-drivers 78. The micro-driver 78 shown in FIG. 8 includes pixel data buffer(s) 100 and a digital counter 114 The pixel data buffer(s) 100 may include sufficient storage to hold image data 70 that is provided (e.g., as a digital code). For instance, the micro-driver 78 may include pixel data buffers to store image data 70 for a display pixel 77 at any one time (e.g., for 8-bit image data 70, this may be 24 bits of storage). It should be appreciated, however, that the micro-driver 78 may include more or fewer buffers, depending on the data rate of the image data 70 and the number of display pixels 77 included in the image data 70. The pixel data buffer(s) 100 may take any suitable logical structure based on the order that the column driver 74 provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the micro-driver 78 may provide the emission clock signal (EM_CLK). A counter 114 may receive the emission clock signal (EM_CLK) as an input. The pixel data buffer(s) 100 may output enough of the stored image data 70 to output a digital data signal 104 represent a desired gray level for a particular display pixel 77 that is to be driven by the micro-driver 78. The counter 114 may also output a digital counter signal 106 indicative of the number of edges (only rising, only falling, or both rising and falling edges) of the emission clock signal (EM_CLK) 98. The digital data signals 104 and the digital counter signals 106 may enter a comparator 108 that outputs an emission control signal 110 in an "on" state when the digital counter signal 106 does not exceed the digital data signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 9:
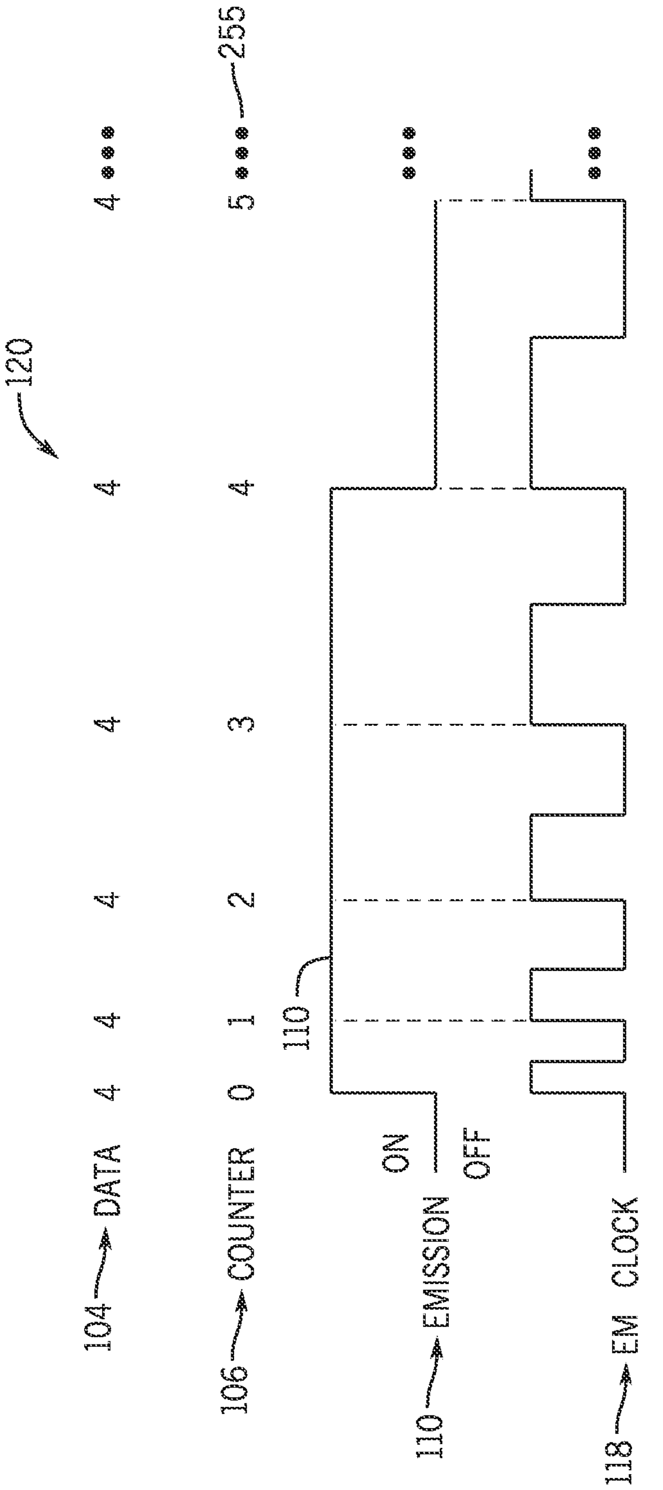
FIG. 9 is a timing diagram illustrating an example operation of the micro-driver of FIG. 8, in accordance with an embodiment.

A timing diagram 120, shown in FIG. 9, provides one brief example of the operation of the micro-driver 78. The timing diagram 120 shows the digital data signal 104, the digital counter signal 106, the emission control signal 110, and the emission clock signal (EM_CLK) represented by numeral 118 In the example of FIG. 9, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the digital data signal 104. When the digital counter signal 106 reaches the digital data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 10:
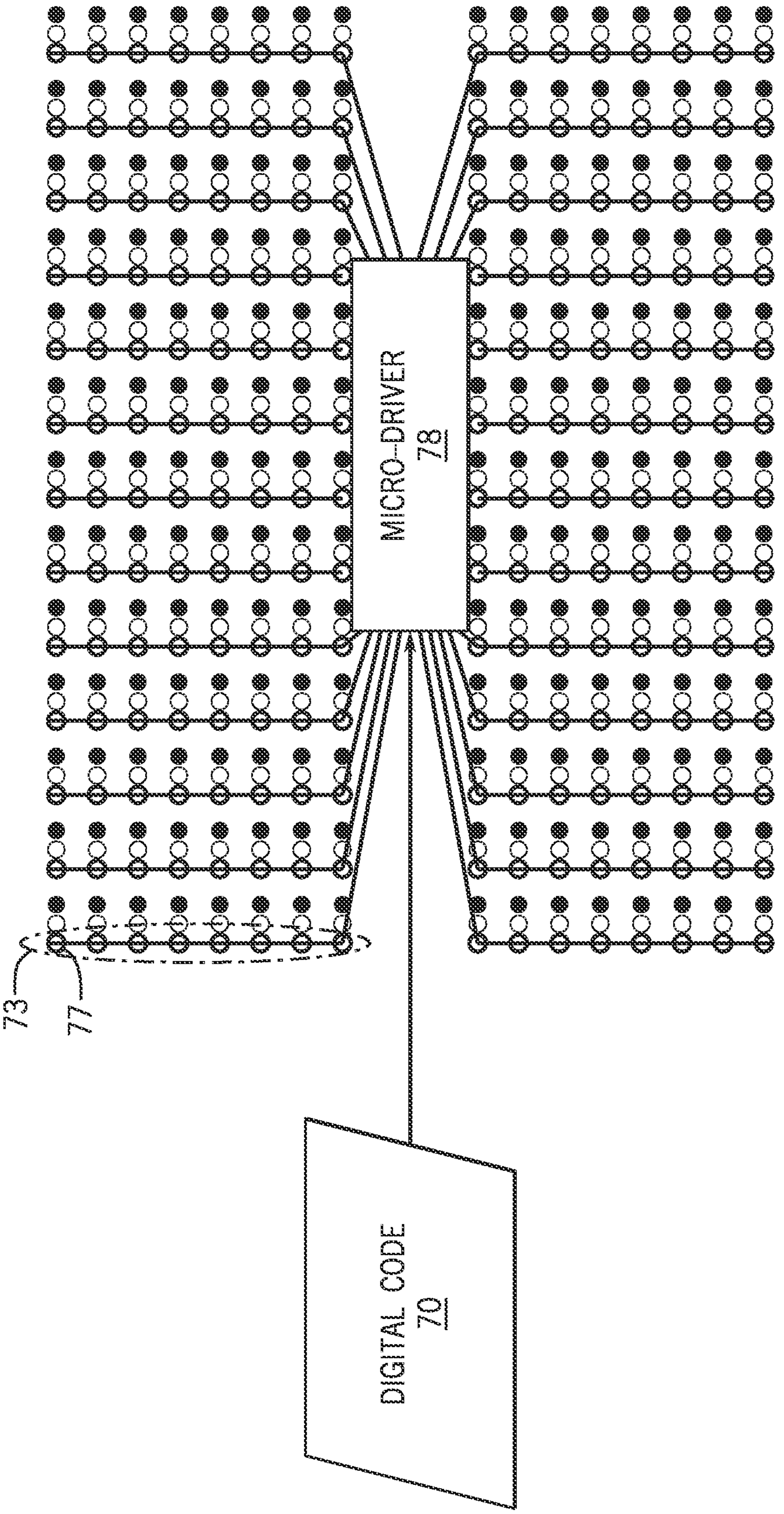
FIG. 10 is a schematic illustration of the micro-LED display of FIG. 7, where a micro-driver controls a collection of display pixels based on a digital code, in accordance with an embodiment.

With the preceding in mind, FIG. 10 illustrates the micro-driver 78 driving the display pixels 77 according to the image data 70 in the form of a digital code, and thereby enabling image content to be displayed by the electronic display 12. As mentioned above, the micro-driver 78 may drive any suitable number of display pixels 77, and a subset of display pixels 77 may be located on respective anodes 73 of the electronic display 12. As illustrated, the subset of display pixels 77 located on each anode 73 may be associated with a particular color (e.g., red, green, blue). Further, it should be noted that a respective cathode corresponds to a subset of display pixels 77 associated with a particular color even though each cathode for a particular color channel is not illustrated in FIG. 10. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 10 for ease of illustration.

As previously stated, the electronic display 12 may draw excessive electrical power from the power supply 84, causing the electronic device 10 to malfunction. For example, by drawing excessive electrical power, the electronic device 10 may experience a malfunction that may cause a front-of-screen (FoS) artifact in the electronic display 12 due to supply ripple, panel overheating (e.g., from power supply 84), and/or voltage-current (IR) drop.

To prevent such an excessive current from being drawn, the amount of current that would be drawn at different periods of time while the electronic display 12 would be displaying an image may be tracked. As will be explained with respect to FIGS. 11 and 12, this may involve not just tracking an average pixel luminance or average pixel level (APL) of an image to be displayed on the electronic display 12. Indeed, FIGS. 11 and 12 both describe images that could be displayed on the electronic display 12 that have an average pixel level of 50%, but which result in very different peak currents because of the way a micro-LED display drives different pixels to emit light. Namely, in contrast to an electronic display that performs a line-by-line raster scan to program and display images, the electronic display 12 may drive display pixels 77 in many different areas (e.g., rows) simultaneously.

Figure 11:
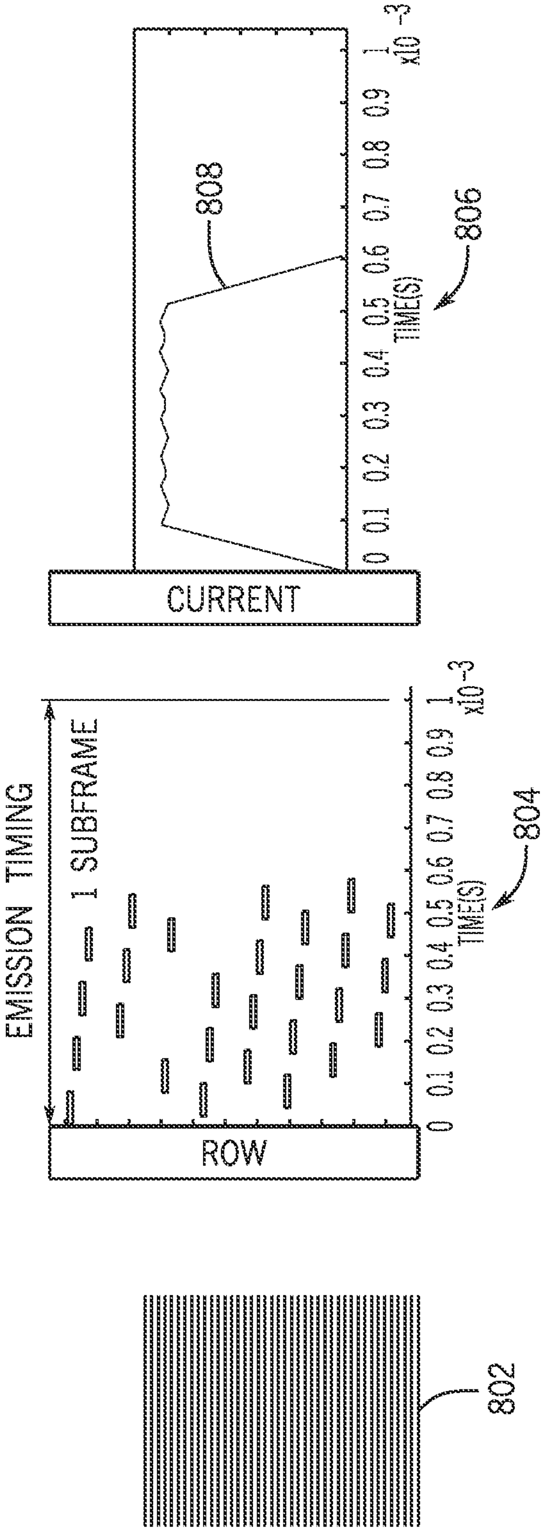
FIG. 11 illustrates an example of an electronic display displaying an image and an emission timing scheme that may lead to the excessive peak current, in accordance with an embodiment.

FIG. 11 illustrates an example of an electronic display displaying an image that may result in a significant peak luminance and an emission timing scheme associated with the image. For example, the electronic display 12 may display an image 802 that may result in a high peak current. The image 802 on the electronic display 12 may, for example, have an average pixel level (APL) of 50%. In some cases, APL may be tracked and analyzed to determine the peak current in a panel of the electronic display 12 or in a portion of a panel of the electronic display 12.

However, as will be discussed in greater detail with respect to FIG. 12 below, an electronic display 12 displaying an image with the same APL as the image 802 may result in a smaller peak current than the peak current shown in graph 806 (e.g., due to emission timing). An emission timing diagram 804 illustrates an emission timing scheme of rows of pixels 77 in the electronic display 12 with a short duty cycle (e.g., a duty cycle of less than 10%). Because current for the electronic display 12 is being drawn by relatively few rows of pixels over a short period of time, the electronic display 12 may experience a high peak current 808, as may be observed from the graph 806. As such, merely tracking APL may be insufficient, and the pulse width and the emission timing of the pixels 77 may be tracked in order to determine peak current with sufficient accuracy.

Figure 12:
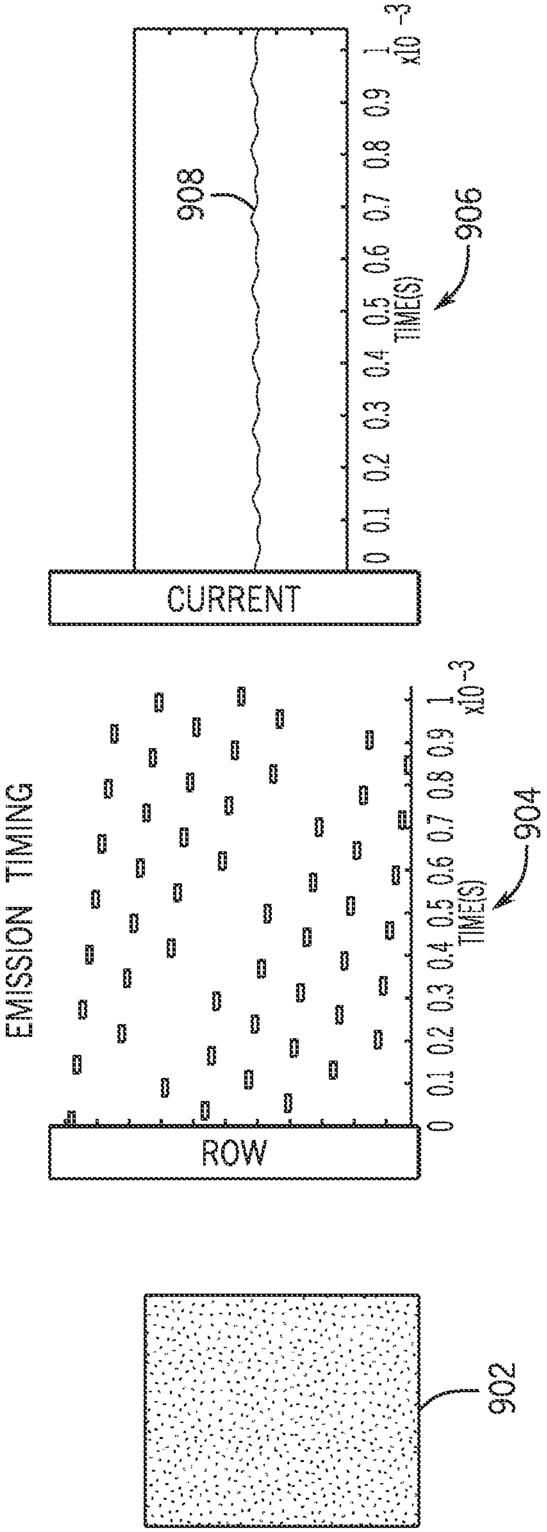
FIG. 12 illustrates an example of an electronic display displaying an image and an emission timing scheme that may prevent excessively high peak currents, such as those illustrated in FIG. 11, in accordance with an embodiment.

FIG. 12 is an example of an electronic display displaying an image with the same APL as the image shown in FIG. 11 but having a lower peak current than illustrated in FIG. 11. The image 902 has an APL of 50%, identical to the image 802 in FIG. 11. However, as may be observed from the graph 906, while the average current associated with the image 902 may be similar to the average current associated with the image 802, the peak current 908 may be lower than the peak current 808. As may be observed from emission timing diagram 904, current may be supplied to a greater number of rows of the pixels 77 over a greater period of time (when compared to the emission timing diagram 804), which may result in the lower peak current illustrated in the graph 906. Accordingly, and as previously mentioned, merely tracking and adjusting APL may be insufficient to determine and/or mitigate excessively high peak currents, such as peak currents that may exceed a PMIC output current limit or that cause voltage drop across the display panel that exceeds a voltage drop threshold. The pulse width and the emission timing of the pixels 77 may be tracked in order to determine peak current with sufficient accuracy.

In some cases, the reduced peak currents associated with the image 902 may be achieved by limiting the amount of power available to each pixel according to a worst-case scenario (e.g., a scenario in which every pixel 77 were emitting a maximum possible amount of light all at once). While such a measure may prevent the electronic display from drawing excessive power, limiting the pixels 77 in this way may reduce the dynamic range of the electronic display 12 and reduce the capability of the electronic display 12 to show high dynamic range (HDR) images. Systems and methods for providing fine-grain real-time peak luminance control (RTPLC) will be described in the embodiments below.

In one or more embodiments, a peak luminance of the electronic display may be estimated and modulated in real-time (e.g., for a presently displayed image frame on the electronic display) to enable bright pixels (e.g., pixels provided with a relatively greater amount of current) to be shown on the electronic display so long as the power drawn by the electronic display does not exceed a threshold or cause a voltage drop greater than a voltage drop threshold.

Figure 13:
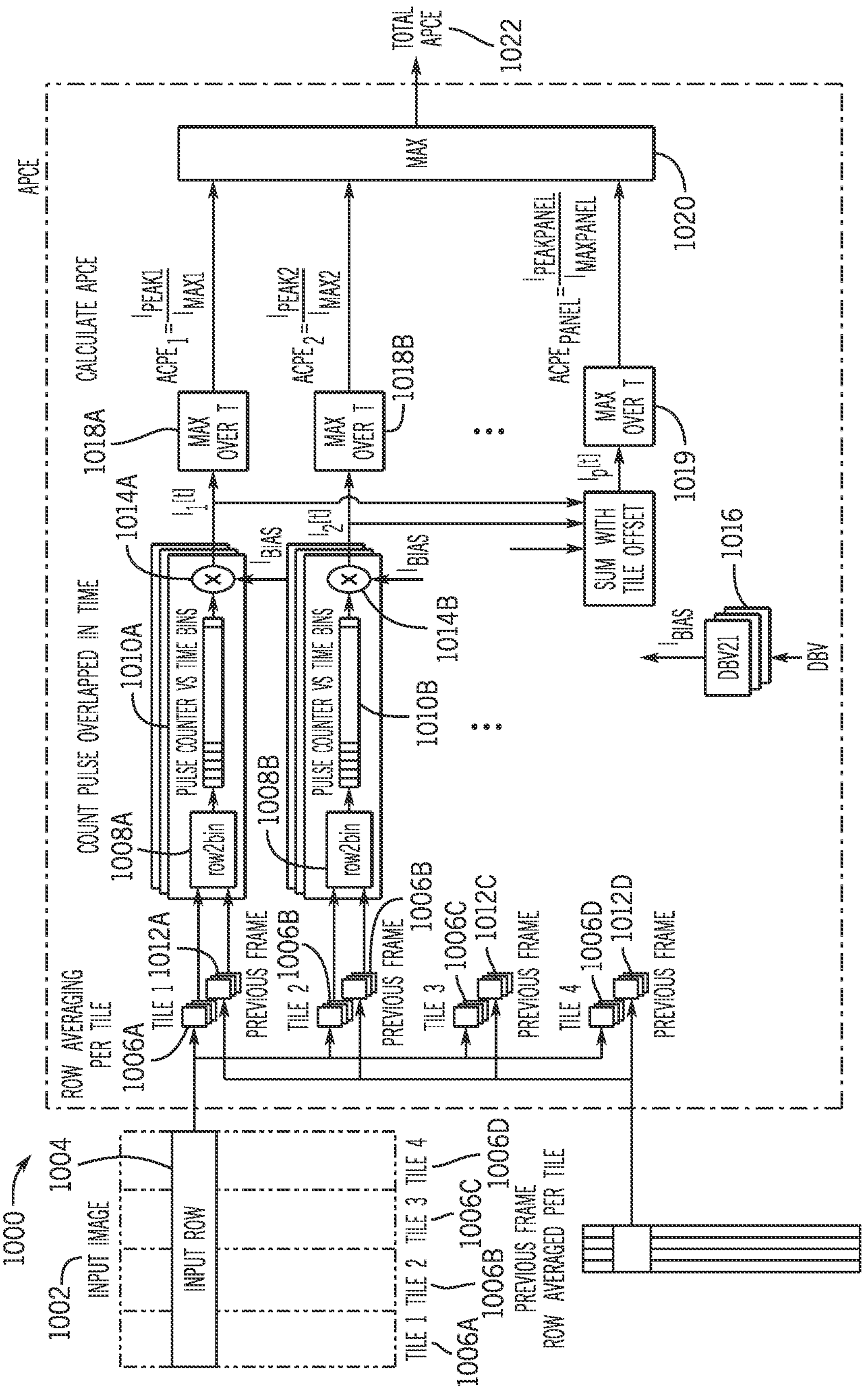
FIG. 13 is a block diagram of a system that may be employed in the electronic display of FIG. 1 to determine peak current across discrete tiles of a panel of the electronic display and/or to determine peak current across the entire panel and perform real-time peak luminance control (RTPLC) on the electronic display, in accordance with an embodiment.

FIG. 13 is a block diagram of a system 1000 that may be employed in the electronic display 12 to determine peak current across discrete tiles of a panel of the electronic display 12 and/or to determine peak current across the entire panel. The system 1000 may include input image data 1002, including input image data for an input row 1004 of pixels 77. The input row 1004 may be divided into tiles 1006A, 1006B, 1006C, and 1006D (collectively referred to herein as the tiles 1006). The tiles 1006 may include groupings of pixel columns intersecting the input row 1004 of pixels.

The system 1000 may also include lookup tables (LUTs) 1008A and 1008B (collectively referred to herein as the LUTs 1008) and pulse counters 1010A and 1010B (collectively referred to herein as the pulse counters 1010) which together may estimate, in real time or near real time, the peak current of the tiles 1006. The LUTs 1008 are labeled "row2bin" in FIG. 13 to signify that they may include information regarding which of the input rows 1004 start at which time bin. In some embodiments, the time bin at which the input rows 1004 start may be fixed.

Figure 14:
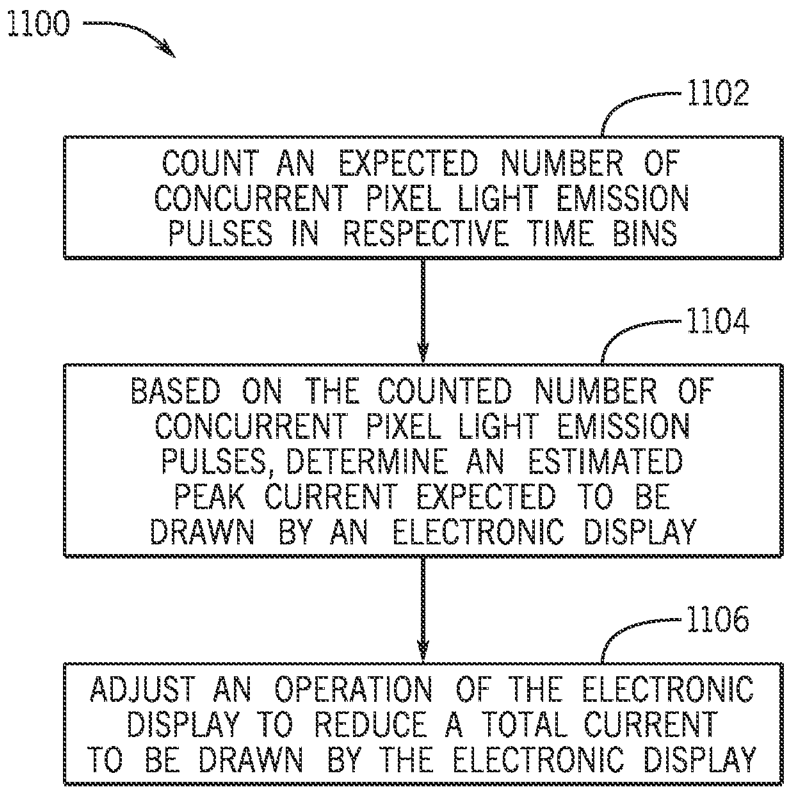
FIG. 14 is a flowchart of a method by which the system of FIG. 13 may determine peak current across the tiles of a panel of the electronic display and/or to determine peak current across the entire panel, and adjust an operation of the electronic display accordingly, in accordance with an embodiment.

FIG. 14 is a flowchart of a method 1100 by which the system 1000 may determine peak current across the tiles 1006 of a panel of the electronic display 12 and/or to determine peak current across the entire panel, and adjust an operation of the electronic display accordingly. In process block 1102, the system 1000, via the LUTs 1008 and the pulse counters 1010, may count an expected number of concurrent pixel light emission pulses in respective time bins.

Returning to FIG. 13, the pulse counters 1010 may count how many pixels 77 in multiple input rows 1004 may emit pulses of light for each time bin. The input image data 1002 for each tile 1006 may include a pixel value that may indicate a pulse width of the emission. The pulse width of the emission corresponds to the length of time the pixel 77 emitting the pulse will be on (i.e., will be emitting). For example, if image data has a pixel value of 255, the pixels 77 in the tile 1006 receiving that image data will emit the longest possible pulse (i.e., and thus emit a relatively large amount of light), while image data with a pixel value of 2 will emit a very short pulse (i.e., and thus emit a relatively small amount of light). Accordingly, the LUT 1008 enables the pulse counter 1010 to determine the time bin at which each pulse from each of the input row 1004 begins, and the pulse width of the emission pulses, as indicated by the pixel value for each of the tiles 1006, may enable the pulse counter 1010 to determine the time bin at which each pulse from each of the input rows 1004 ends.

As will be discussed in greater detail in FIG. 14 below, based on the pulse widths of the image data, the pulse counters 1010 may count the number of pulses from the tiles 1006 in a given input row 1004 that occupy a given time bin. The pulse counters 1010 may then repeat this counting for each subsequent row, and tally the number of the input rows 1004 that emit pulses during a given time bin for a given frame. Once a new frame enters and image data from the new frame is loaded into the tiles 1006, the pulse counters 1010 may subtract out previous frame data from previous frame tiles 1012A, 1012B, 1012C, and 1012D (collectively referred to herein as the previous frame tiles 1012) as the new image data enters the tiles 1006A, 1006B, 1006C, and 1006D.

It should be noted that, while only four tiles are shown, there may be any appropriate number of tiles (e.g., 10 tiles or more, 100 tiles or more, 1,000 tiles or more, and so on) included in the system 1000. Further, while only two LUTS 1008 and two pulse counters 1010 are illustrated, there may be an LUT 1008 and a pulse counter 1010 for each tile 1006. The tiles 1006 may include image data corresponding to each color channel of the input row 1004 (e.g., a red color channel may include the image data for the red subpixels in the input row 1004, a green color channel may include the image data for the green subpixels in the input row 1004, and a blue color channel may include the image data for the blue subpixels in the input row 1004). Accordingly, the LUTs 1008 and the pulse counters 1010 may estimate APL for each individual color channel.

Figure 15:
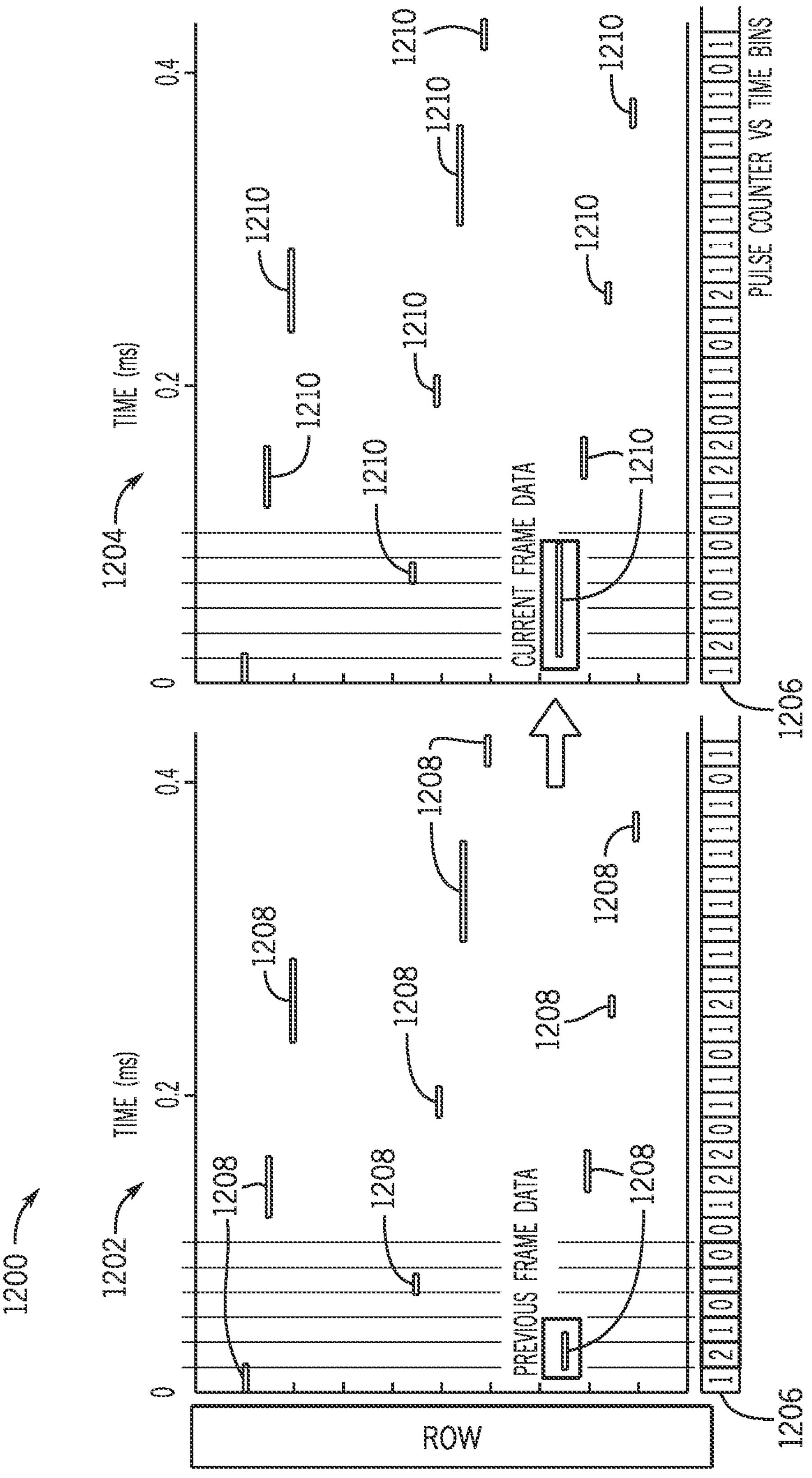
FIG. 15 is a diagram illustrating how a pulse counters of the system of FIG. 13 may count emission pulses per time bin, in accordance with an embodiment.

FIG. 15 is a diagram 1200 illustrating how the pulse counters 1010 count emission pulses per time bin. The diagram 1200 may include a previous frame 1202 including previous frame data 1208 (e.g., as may be stored in the previous frame tiles 1012) and may include a current frame 1204 including current frame data 1210 (e.g., as may be stored in the tiles 1006). In the previous frame 1202, the pulse counter 1010 may determine the number of pulses of the previous frame data 1208 that co-occur (i.e., overlap in time) for each time bin 1206. Although 26 time bins 1206 may be shown, there may be any appropriate number of time bins included in the previous frame 1202 and/or the current frame 1204. In some embodiments, each of the time bins 1206 may be equal to 1/56 milliseconds. In the previous frame 1202, the pulse counter 1010 may count all of the pulses of the previous frame data 1208 from multiple of the input rows 1004 that co-occur for each of the time bins 1206. As previously discussed, the width of the previous frame data pulses and the width of the current frame data 1210 may correspond to the pixel data value associated with each pulse such that a larger pixel data value (e.g., 255) may correspond to a longer pulse width and a smaller pixel data value (e.g., 2) may correspond to a smaller pulse width.

As the previous frame 1202 exits and the current frame 1204 enters the system-on-chip (SoC), the pulses counter 1010 may subtract out the pulses from the previous frame data 1208 and count the pulses from the current frame data 1210, such that the time bins 1206 may only reflect the pulses from the input rows 1004 of a current image frame. In some embodiments, to save memory instead of storing the pixel information from the previous frame 1202, the pulse counter 1010 may average the pulse emissions from each input row 1004 in the same tile 1006.

In process block 1104 of the method 1100 in FIG. 14, the system 1000 will, based on the number of concurrent pixel light emission pulses counted by the pulse counters 1010, determine an estimated peak current expected to be drawn by the electronic display 12. Looking again to FIG. 13, the system 1000 may multiply at the multiplication blocks 1014A and 1014B (herein collectively referred to as the multiplication blocks 1014) the number of concurrent pixel light emission pulses for each of the time bins 1206 by a bias current (i.e., $I_{BIAS}$). The bias current LUT 1016 may supply the bias current for each time bin 1206, which will be multiplied by the number of pulses in each of the time bins 1206 to obtain the maximum current per-tile 1006.

Once the maximum amount of current per tile is derived (e.g., at blocks 1018A, 1018) and the maximum panel relative current is determined considering tile offsets at block 1019, a maximum relative current may be determined at block 1020 based on the maximum tile relative current and the maximum panel relative current. The maximum relative current of the electronic display 12 includes the total tile relative current and the panel relative current over time (t). The maximum relative current may be determined to represent a worst-case scenario for overcurrent or voltage drop across the electronic display 12.

In addition to determining max current of the tiles 1006 and of the panel, the system 1000 may determine average pixel current equivalent (APCE) for each of the tiles 1006 using the formula $$APCE = \frac{I_{PEAK}}{I_{MAX}}.$$

APCE for tiles $APCE_1$, $APCE_2$, . . . , can be used to estimate voltage-current (IR) drop, or voltage headroom and APCE for the display panel (e.g., $APCE_{panel}$) can be used to estimate excessive power draw from power source. The APCE for each tile 1006 and the APCE of the electronic display panel may be compared to find a maximum tile and/or panel current, or a weighted sum of APCE for tiles and the APCE of the electronic display panel can be compared to the APCE of the display in block 1020 to obtain total APCE 1022. Or more complex algorithms may be implemented in block 1020 to determine total APCE 1022. Returning to FIG. 14, once the estimated peak current (i.e., total APCE 1022) expected to be drawn by the electronic display 12 is determined, in process block 1106, the system 1000 may adjust an operation of the electronic display 12 to reduce the total current drawn by the electronic display.

For example, by drawing excessive current, the electronic device may experience a malfunction that may cause a front-of-screen artifact in the electronic display due to supply ripple, panel overheating (e.g., from PMIC), and/or voltage-current (IR) drop. Determining peak current (e.g., total APCE 1022) of the electronic display 12 may assist in addressing panel overheating. For example, a panel APCE threshold may be established based on the panel-level peak current calculations determined by the system 1000. Once the panel-level peak current is reached, an adjustment may be made to the operation of the electronic display 12. For example, the power supply of the electronic display 12 may be reduced (e.g., by reducing the output of the power supply 84) to prevent panel overheating. As another example, the image data may be linearly scaled down (e.g., the brightness of the image data may be linearly scaled down) to maintain relative contrast and relative luminance for the displayed image on the electronic display 12 while reducing the current drawn by the electronic display 12. Linearly scaling down the brightness of the image data causes the images on displayed on the electronic display 12 to be darker.

Figure 16:
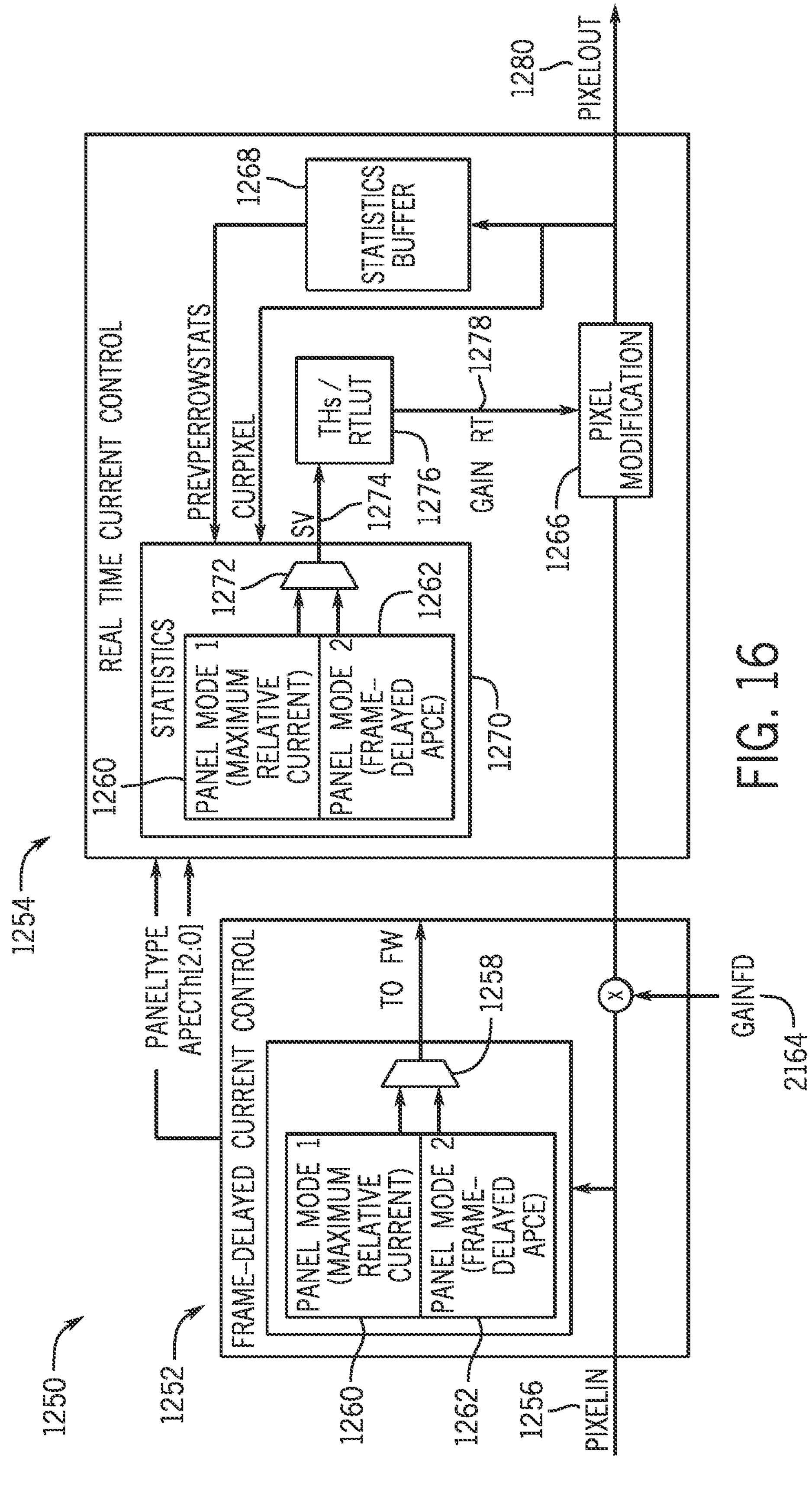
FIG. 16 is a block diagram of an RTPLC system illustrating how image data may be adjusted to control current drawn the electronic display, in accordance with an embodiment.

FIG. 16 is a block diagram of an RTPLC system 1250 illustrating how the image data may be adjusted to control current drawn by the electronic display, according to embodiments of the present disclosure. RTPLC may include different current control functionalities, such as frame-delayed current control 1252 and real-time current control 1254. The frame-delayed current control 1252 may gather statistics for a software brightness reduction on a frame-by-frame basis. The real-time current control 1254 may scale down display pixels 77 on a row-by-row granularity.

The frame-delayed current control 1252 may receive pixel data 1256. The pixel data 1256 may be received from the system 1000. In particular, the pixel data 1256 may include current per-tile data, tile-level APCE data, panel-level current data, panel-level APCE data, max current data, or total APCE 1022 data. A panel mode may be selected by a multiplexer 1258. For example, an electronic display 12 may enable a first panel mode 1260 (e.g., corresponding to a quantum-dot light-emitting diode (QLED)) display or may enable a second panel mode 1262 (e.g., corresponding to an OLED display) based on selection of the multiplexer 1258 and the pixel data 1256. A gain (e.g., a negative gain) 1264 may be applied to the pixel data 1256 to adjust the pixel brightness down to prevent drawing excessive current or to prevent excessive voltage drop.

The pixel data 1256 may be received by real-time pixel modification circuitry 1266 that may provide modification to the pixel data 1256 in real-time based on data received from the frame-delayed current control 1252 and or statistical analysis of previous frames or rows of display pixels 77. The pixel data 1256 may be received by the statistics buffer 1268. The statistics buffer 1268 may collect statistics (e.g., current, luminance, APCE, and so on) from previous frames or from previous rows of the same frame. The statistics buffer may output previous row statistics, current pixel statistics, or both to statistics circuitry 1270. Multiplexer 1272 may select either the first panel mode 1260 or the second panel mode 1262 based on the selection via the multiplexer 1258. Based on the selection, the multiplexer 1272 outputs a statistics value 1274 to a real-time LUT 1276. The real-time LUT 1276 outputs a real-time gain 1278 to the real-time pixel modification circuitry 1266, applying a real-time modification to the pixel data 1256. The real-time pixel modification circuitry 1266 outputs the modified pixel data 1256 to the statistics buffer 1268 to continue the iterative real-time pixel modification process and outputs the modified pixel data 1256 as output pixel data 1280.

Determining maximum current per-tile (e.g., tile-level peak current) may assist in addressing IR drop, which may lead to front-of-screen artifacts. For example, a tile APCE threshold may be established based on the tile-level peak current calculations determined by the system 1000. Once the maximum current per-tile is reached, power may be reduced (e.g., by the power supply 84) to prevent IR drop in the electronic display 12. Moreover, the system 1000 may determine when tile APCE (e.g., $APCE_1$, $APCE_2$) exceeds a maximum current threshold while the $APCE_{panel}$ or the total APCE 1022 is low. This may help mitigate excessive IR drop across the panel even in situations where the $APCE_{panel}$ or the total APCE 1022 thresholds are not exceeded. In this way, the system 1000 may provide a fine-grain real-time peak luminance control (RTPLC) to the electronic display 12.

Figure 17:
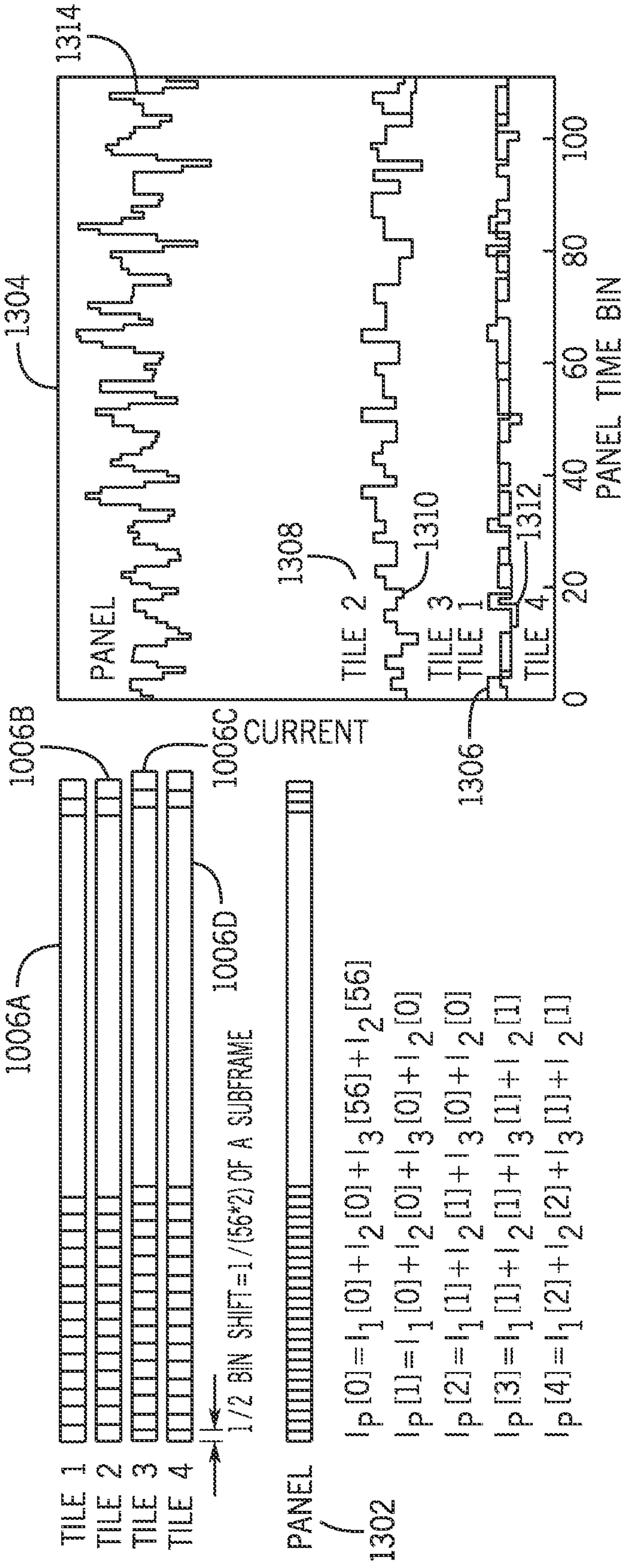
FIG. 17 provides an exemplary illustration of summing per-tile APCE values to derive a per-panel APCE value for a panel of the electronic display of FIG. 1, in accordance with an embodiment.

FIG. 17 provides an illustration of summing per-tile APCE values to derive $APCE_{panel}$ for a panel of the electronic display 12, according to embodiments of the present disclosure. The tile-level APCE may be determined by the system 1000 as described in the discussion of FIG. 13. To determine $APCE_{panel}$, the system 1000 (e.g., the block 1020) may use the tile-level APCE calculations and solve for the current across the panel 1302 considering time offset between tiles using the formula $I_{PANEL}[t]=\Sigma_{i=0}^{n_{tiles}-1} I_{tile,i}[[t-\Delta_i]]$, where t is time bin index and $\Delta_i$ is timing offset of tile i (e.g., which may be fraction such as ½ or 7/2). The system 1000 may filter (e.g., similarly to block 1019) the tile-level APCE to obtain the max current over time (t), and then calculate panel-level APCE using the formula $$APCE_{panel} = \frac{I_{PEAK}}{I_{MAX,panel}}.$$

The graph 1304 illustrates tile 1 current output 1306, a tile 2 current output 1308, a tile 3 output current 1310, and a tile 4 output current 1312. The system 1000 may use the formula above to derive the panel current ($I_{PANEL}$) 1314 as described. In other embodiments, the panel current 1314 may be obtained by shifting the tile-level currents rather than performing a separate calculation.

Figure 18:
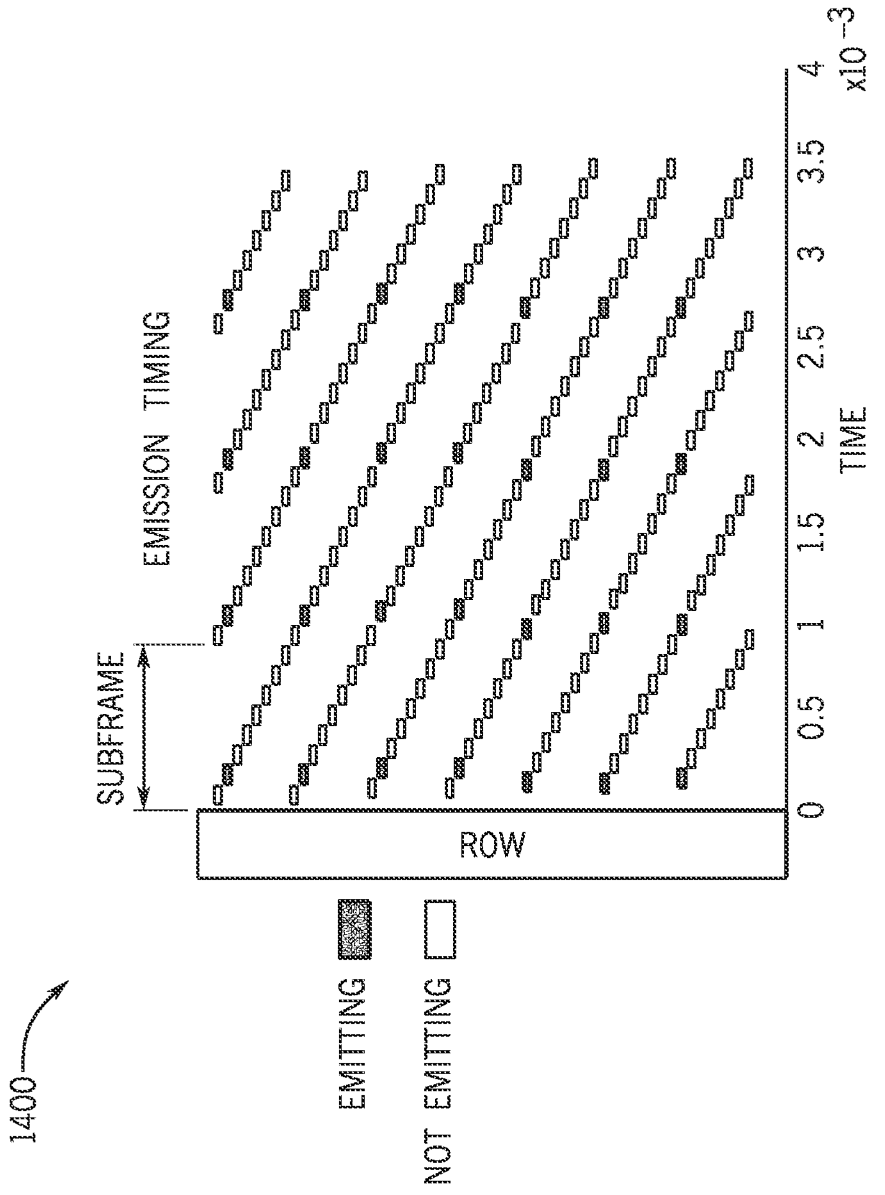
FIG. 18 is an example of a non-shuffled emission timing profile, in accordance with an embodiment.
Figure 19:
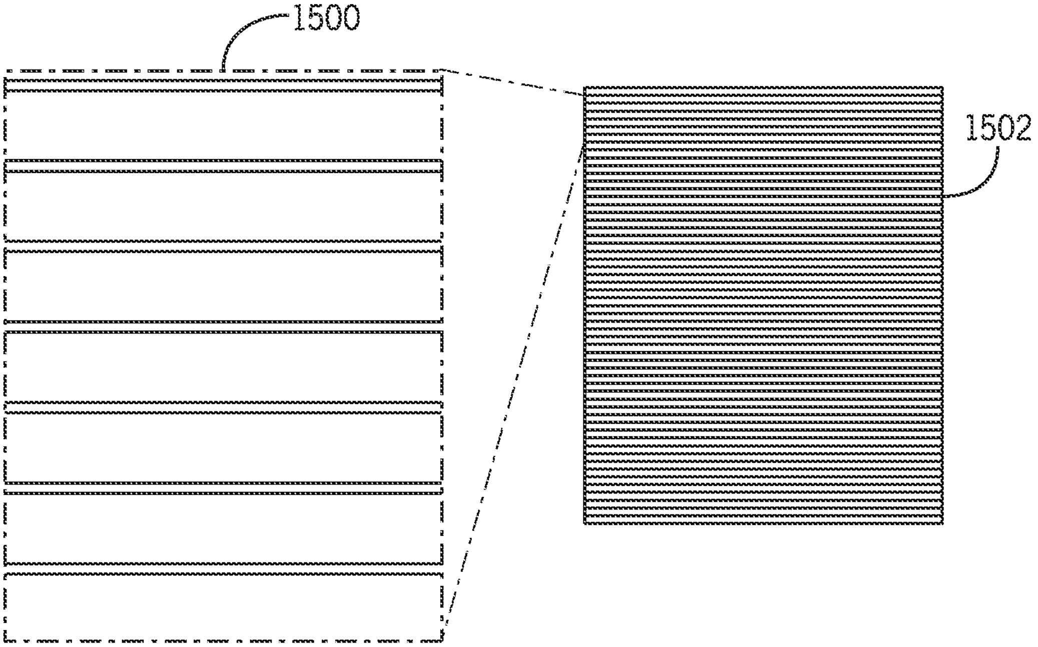
FIG. 19 is an example of an image that may be displayed on the electronic display of FIG. 1 that does not use emission shuffling, in accordance with an embodiment.
Figure 20:
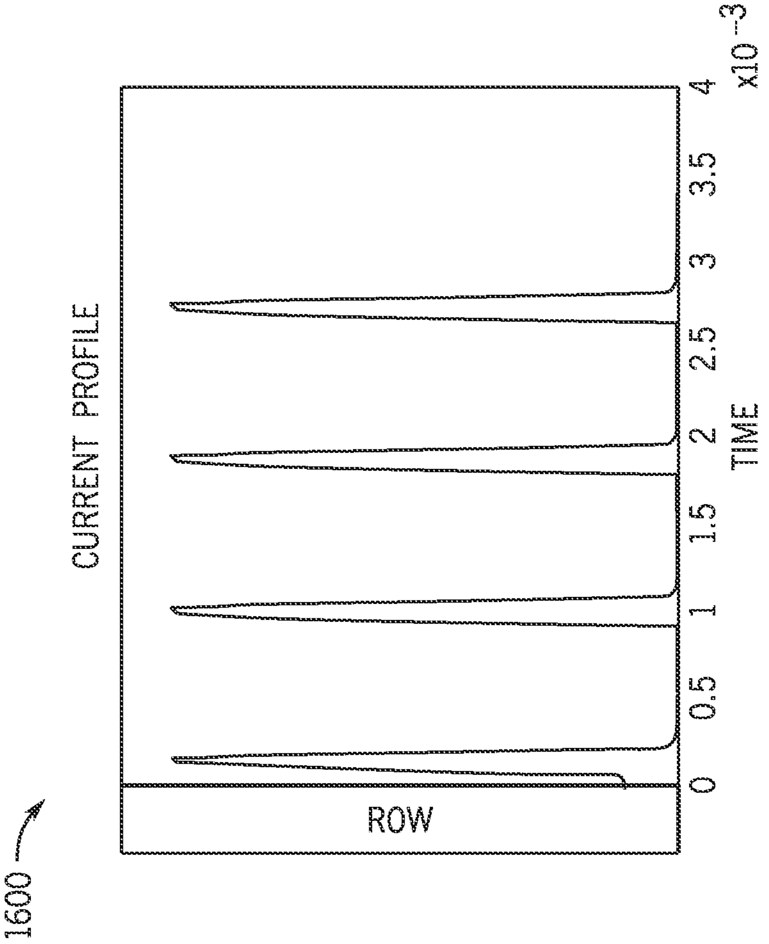
FIG. 20 illustrates an expected current profile of the electronic display of FIG. 1 due to the non-shuffled emission timing profile of FIG. 18, in accordance with an embodiment.

The RTPLC methods and systems described above may be adjusted when the emission timing for the electronic display 12 is shuffled. FIG. 18 is an example of a non-shuffled emission timing profile 1400. FIG. 19 is an example of an image 1500 and an image 1502 that may be displayed on an electronic display 12 that does not use emission shuffling. As may be observed, the image 1500 is a zoomed-in version of the image 1502. The images 1500 and 1502 may not necessarily result in high peak currents on the electronic display 12, but may result in image artifacts that may negatively impact user experience. FIG. 20 is an example of an expected current profile 1600 of the electronic display 12 due to the non-shuffled emission timing profile 1400 of FIG. 18.

Figure 21:
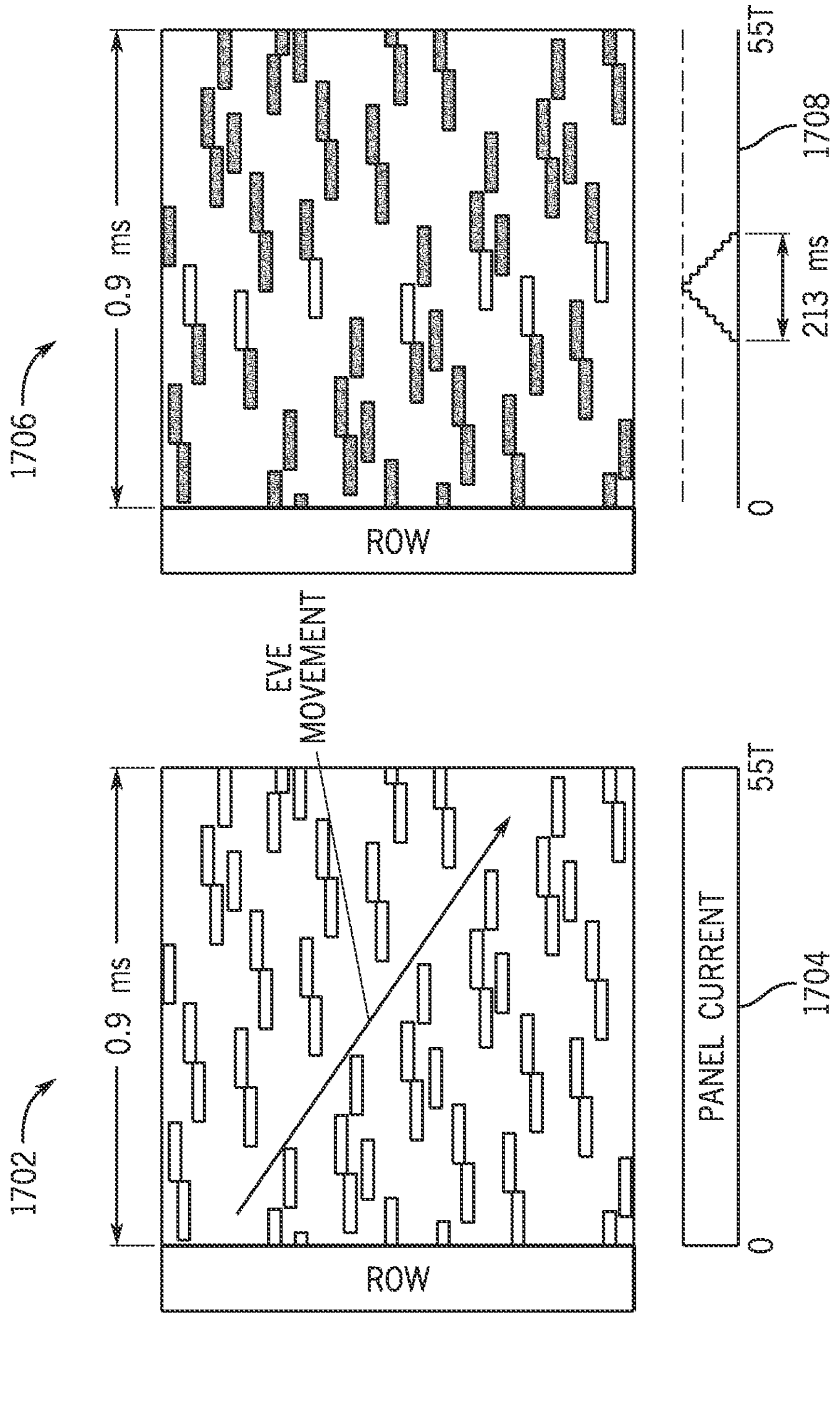
FIG. 21 illustrates a shuffled emission pattern across a panel of the electronic display of FIG. 1 and a tile-level shuffled emission pattern, in accordance with an embodiment.

FIG. 21 illustrates a shuffled emission pattern 1702 across a panel of the electronic display 12 and an unshuffled emission pattern 1706, according to embodiments of the present disclosure. As may be observed, the unshuffled emission pattern 1706 may have a peak transient current 1708 that may cause an image artifact or may exceed a tile relative current threshold, as discussed with respect to FIG. 13. To prevent the peak transient current 1708, the display emissions may be shuffled in multiple dimensions (e.g., may be shuffled per row, per column, and per subframe) to ensure a uniform panel current 1704. However, while the panel current may be uniform, the panel relative current threshold may still be exceeded, and RTPLC may be provided to reduce current drawn by adjusting the PMIC or linearly scaling down the image content, as discussed with respect to the process block 1106 of FIG. 14.

Figure 22:
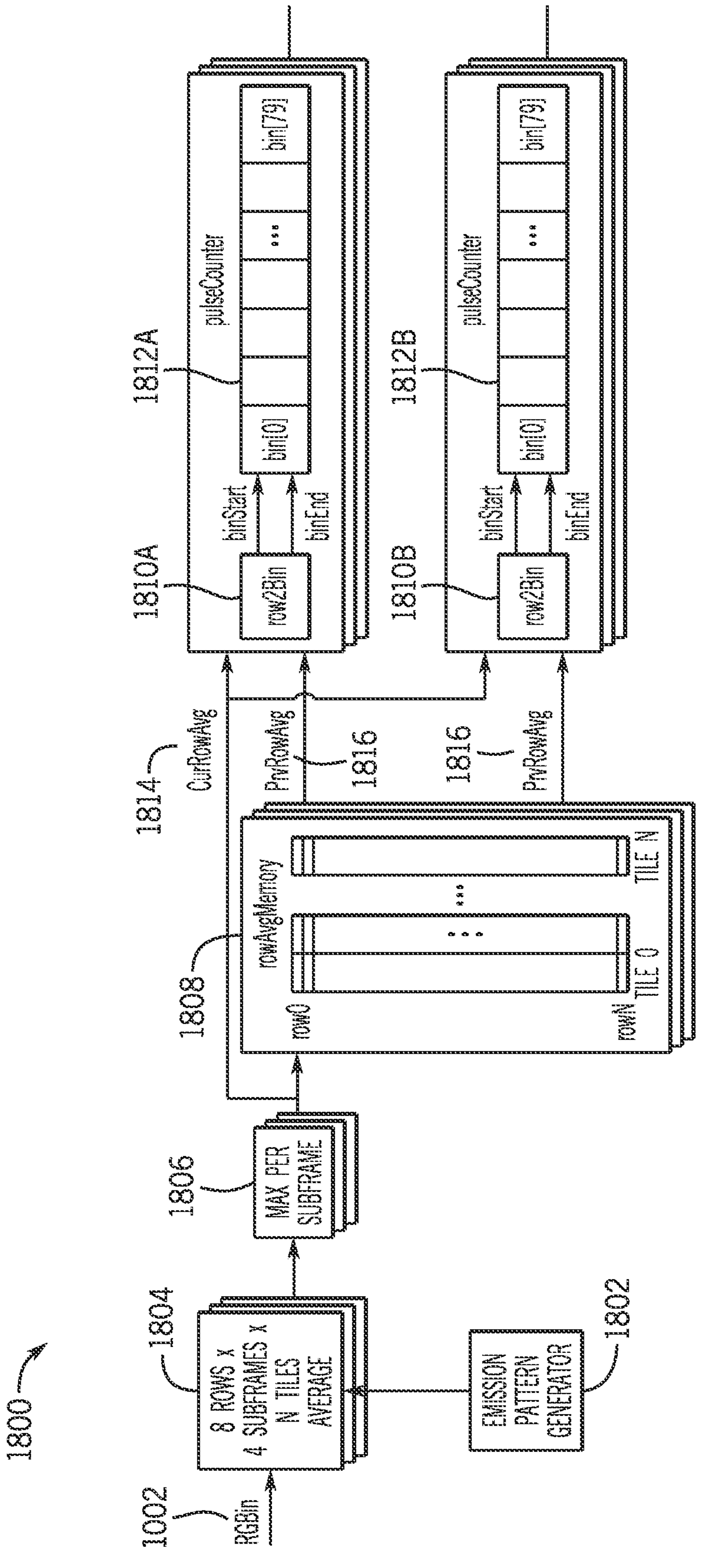
FIG. 22 is a diagram of a system for improving real-time peak luminance control (RTPLC) performance for electronic displays with shuffled emission patterns, in accordance with an embodiment.

FIG. 22 is a diagram of a system 1800 for improving RTPLC performance for electronic displays 12 with shuffled emission patterns, according to embodiments of the present disclosure. The system 1800 may include an emission pattern generator 1802. The emission pattern generator 1802 may determine the shuffling pattern for the pixels 77 in the input rows 1004. The emission pattern generator 1802 may generate a shuffled emission pattern for the input image data 1002. The emission patterns may be tracked, in the block 1804, for 8 input rows 1004 at 4 subframes for N number of tiles 1006 (i.e., the number of the tiles 1006 in each subframe).

Based on the input image data 1002 and the emission pattern generator 1802, a max current per subframe may be estimated in block 1806. The estimated average current per-subframe for each row may be stored in the row average memory 1808. A current frame estimated average current 1814 may be inputted into a LUT 1810A that may determine the time bins at which the emissions from the shuffled emissions pattern begin and end, and the pulses may be counted by the pulse counter 1812A. A previous frame average current 1816 may be removed as a previous frame leaves and as a current frame enters.

In some embodiments LUTs 1810A and 1810B and the pulse counters 1812A and 1812B may operate similarly to the LUTs 1008 and the pulse counters 1010 in FIG. 13. In other embodiments, the LUTs 1810A and 1810B may be expanded to capture start and end time bins at the column level and the subframe level in addition to the tile level.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
an electronic display configured to drive pixels according to pixel light emission pulses; and
processing circuitry configured to:
determine an estimated peak current expected to be drawn by a tile of the electronic display at least in part by counting an expected number of concurrent pixel light emission pulses in respective time bins corresponding to the tile, wherein the tile comprises a portion of the electronic display and wherein counting the expected number of concurrent pixel light emission pulses comprises:
determining a first time bin at which an input row of pixels begins emitting the pixel light emission pulses;
determining, based on input image data supplied to the input row of pixels, a pulse width of the pixel light emission pulses; and
determining a number of pixel light emission pulses in each of the respective time bins based on the first time bin and the pulse width of the pixel light emission pulses; and
in response to determining that the estimated peak current exceeds a threshold, adjust an operation of the electronic display to reduce a total current to be drawn by the electronic display.

2. The electronic device of claim 1, wherein the processing circuitry is configured to adjust the operation of the electronic display by adjusting image data to cause an image displayed on the electronic display to appear darker.

3. The electronic device of claim 1, wherein the processing circuitry is configured to determine the estimated peak current based on determining a display panel-level estimated peak current and determining a tile-level estimated peak current.

4. The electronic device of claim 3, wherein the processing circuitry is configured to determine the tile-level estimated peak current by determining an estimated peak current for a plurality of columns intersecting a plurality of input rows of pixels.

5. The electronic device of claim 1, wherein counting the expected number of concurrent pixel light emission pulses in the respective time bins comprises causing the processing circuitry to:
determine, via an additional lookup table, a second time bin at which an additional input row of pixels begins emitting additional pixel light emission pulses;
determine, based on the input image data supplied to the additional input row of pixels, an additional pulse width of an additional pixel light emission pulse; and
determine, based on the second time bin and the additional pulse width of the additional pixel light emission pulse, an additional number of pixel light emission pulses in each of the respective time bins.

6. The electronic device of claim 5, wherein the processing circuitry is configured to add the number of pixel light emission pulses and the additional pixel light emission pulses in each of the respective time bins to obtain a total number of pixel light emission pulses for each of the respective time bins.

7. The electronic device of claim 6, wherein the processing circuitry is configured to apply a bias current to the total number of pixel light emission pulses for each of the time bins to obtain a total per-tile current.

8. The electronic device of claim 7, wherein the processing circuitry is configured to filter the total per-tile current to obtain a maximum per-tile current over a period of time.

9. The electronic device of claim 8, wherein the processing circuitry is configured to divide a peak per-tile current by the maximum per-tile current over the period of time to obtain an average pixel current equivalent value.

10. The electronic device of claim 9, wherein the processing circuitry is configured to:

determine a maximum of a weighted sum of a per-tile current over the maximum per-tile current over the period of time; and determine panel current over a maximum panel current over the period of time to obtain a total average pixel current equivalent value.

11. The electronic device of claim 1, wherein determining the first time bin comprises using a lookup table (LUT).

12. A tangible, non-transitory, computer-readable medium, comprising instructions configured to, when executed, cause one or more processors to:

receive first pixel emission pulse data corresponding to a first image frame for a tile, the tile comprising a plurality of columns intersecting a plurality of input rows of pixels in an electronic display;

determine a first plurality of pixel emission pulses associated with the first image frame emitted via the plurality of input rows overlapping within a particular time bin; sum the first plurality of pixel emission pulses associated with the first image frame emitted that overlap for the particular time bin;

receive a second pixel emission pulse data corresponding to a second image frame for the tile;

determine a second plurality of pixel emission pulses associated with the second image frame emitted via the plurality of input rows overlapping with the particular time bin;

subtract the first plurality of pixel emission pulses associated with the first image frame emitted that overlap for the particular time bin; and sum the second plurality of pixel emission pulses associated with the second image frame emitted that overlap for the particular time bin.

13. The tangible, non-transitory, computer-readable medium of claim 12, comprising the instructions configured to, when executed, cause the one or more processors to:

receive, from a lookup table, a first time bin at which a first row begins to emit a first pixel emission pulse.

14. The tangible, non-transitory, computer-readable medium of claim 12, wherein the first pixel emission pulse data comprises a pixel value, the pixel value indicating a pulse width of a particular pixel emission pulse.

15. The tangible, non-transitory, computer-readable medium of claim 14, wherein the pixel value comprises a value between 0 and 255.

16. The tangible, non-transitory, computer-readable medium of claim 12, wherein the tile comprises image data corresponding to each color channel of each input row of the plurality of input rows.

17. A method, comprising:

receiving pixel emission pulse data corresponding to a tile, the tile comprising a plurality of columns intersecting a plurality of input rows of pixels in an electronic display;

summing, at a pulse counter, a first number of pixel emission pulses corresponding to a first time bin to obtain a first total number of pixel emission pulses for the first time bin;

summing, at the pulse counter, a second number of pixel emission pulses corresponding to a second time bin to obtain a second total number of pixel emission pulses for the second time bin;

applying a bias current to the first total number of pixel emission pulses for the first time bin to generate a first current value and applying the bias current to the second total number of pixel emission pulses for the second time bin to generate a second current value, and summing the first current value and the second current value to obtain a total current associated with the tile;

based on the total current associated with the tile, determining a total peak current for the tile; and in response to determining that the total peak current for the tile exceeds a threshold, adjusting an operation of the electronic display.

18. The method of claim 17, wherein adjusting the operation of the electronic display comprises reducing an output power of a power supply of the electronic display.

19. The method of claim 17, wherein adjusting the operation of the electronic display comprises adjusting image data for display on the electronic display to be darker.

20. The method of claim 17, wherein the bias current is obtained from a bias current lookup table.

* * * * *